United States Patent [19]

Kubanek

[11] 4,191,340

[45] Mar. 4, 1980

[54] ELECTRIC OPERATED AUTOMATIC DOWNRIGGER

[76] Inventor: Emil Kubanek, R.R. #2, Box 380 A, Hamilton, Mich. 49419

[21] Appl. No.: 965,260

[22] Filed: Nov. 30, 1978

[51] Int. Cl.$^2$ .......................................... B65H 63/08
[52] U.S. Cl. .................................. 242/54 R; 33/136; 43/4; 242/106; 242/84.1 L
[58] Field of Search ................ 242/106, 86.5 R, 54 R, 242/54 A, 57, 191, 84.1 A, 84.1 M, 84.1 L; 43/4, 27.4, 43.12, 21; 33/126.6, 126.4 A, 127, 136; 200/61.13–61.17; 254/174, 173 R

[56] References Cited

U.S. PATENT DOCUMENTS

| | | | |
|---|---|---|---|
| 2,272,213 | 2/1942 | Lear | 242/54 A X |
| 2,355,381 | 8/1944 | Lear | 33/136 X |
| 3,167,264 | 1/1965 | Ohtsu | 242/57 X |
| 3,301,533 | 1/1967 | Pfaff et al. | 254/174 |
| 3,910,524 | 10/1975 | Ireland | 242/106 |
| 3,922,808 | 12/1975 | Rieth et al. | 242/106 X |
| 4,000,653 | 1/1977 | Booth et al. | 242/106 X |

Primary Examiner—John M. Jillions
Attorney, Agent, or Firm—Blanchard, Flynn, Thiel, Boutell & Tanis

[57] ABSTRACT

A downrigger apparatus for trolling in which an electric motor is energizable for winding and unwinding downrigger line from a reel. A rotor is driven in reduced speed synchronism with the reel and automatically actuates up and down limit switches to stop winding and unwinding rotation of the reel by the motor. The down limit switch is carried by a support adjustable along the path of movement of the rotor through a range of positions corresponding to different lengths of line unwound from the reel, with cooperating pointer and indicia means to indicate the length of the line unwound from the reel.

10 Claims, 5 Drawing Figures

U.S. Patent  Mar. 4, 1980  Sheet 1 of 2  4,191,340
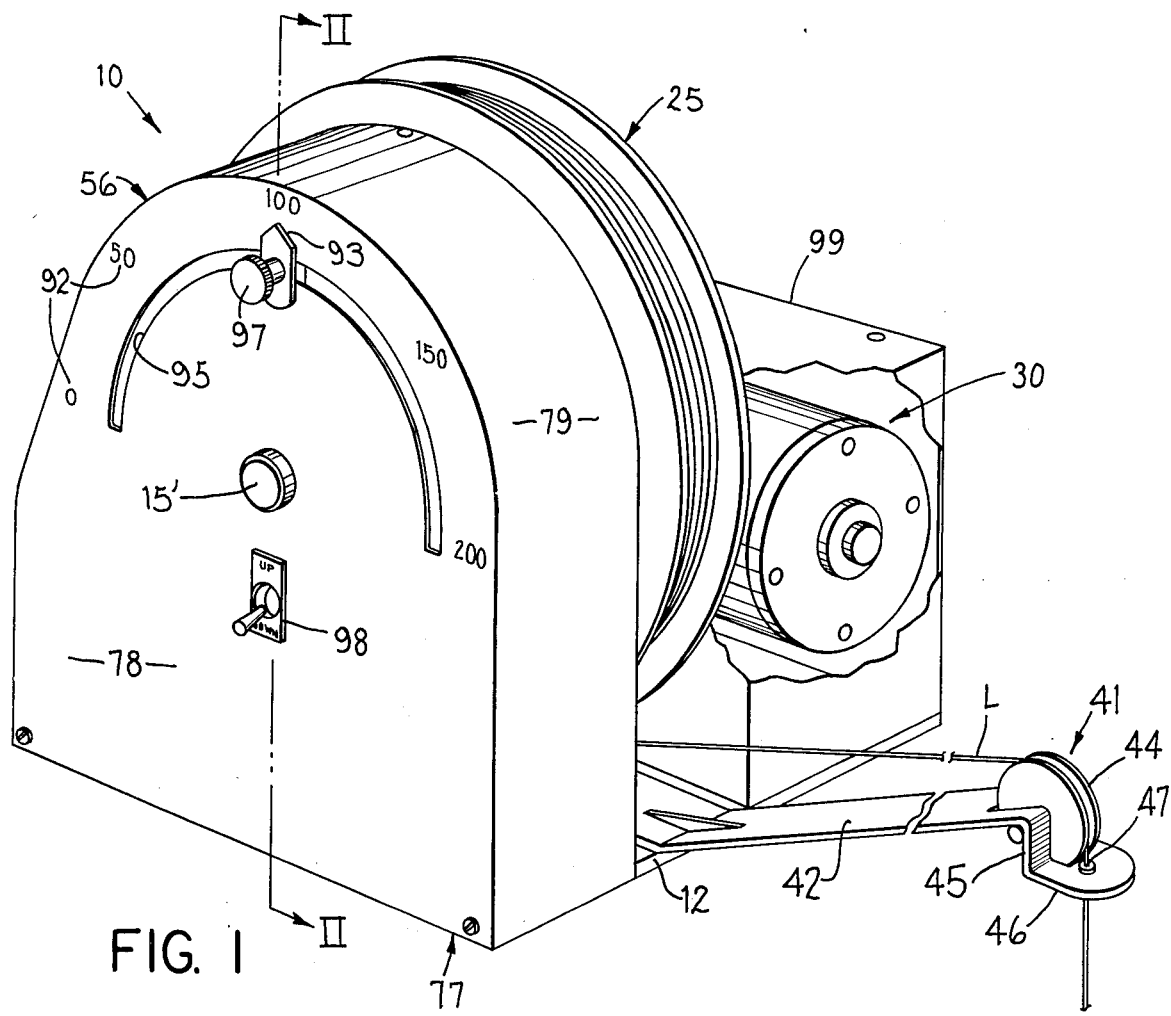
FIG. 1
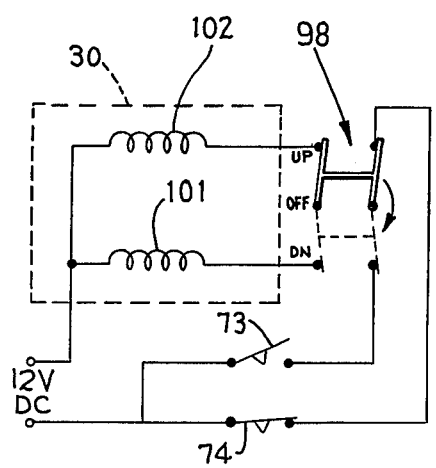
FIG. 4
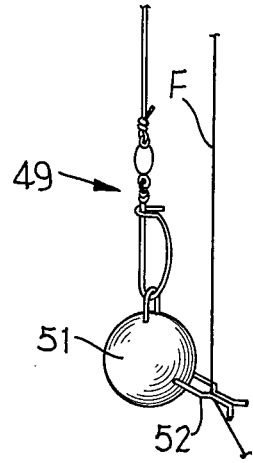

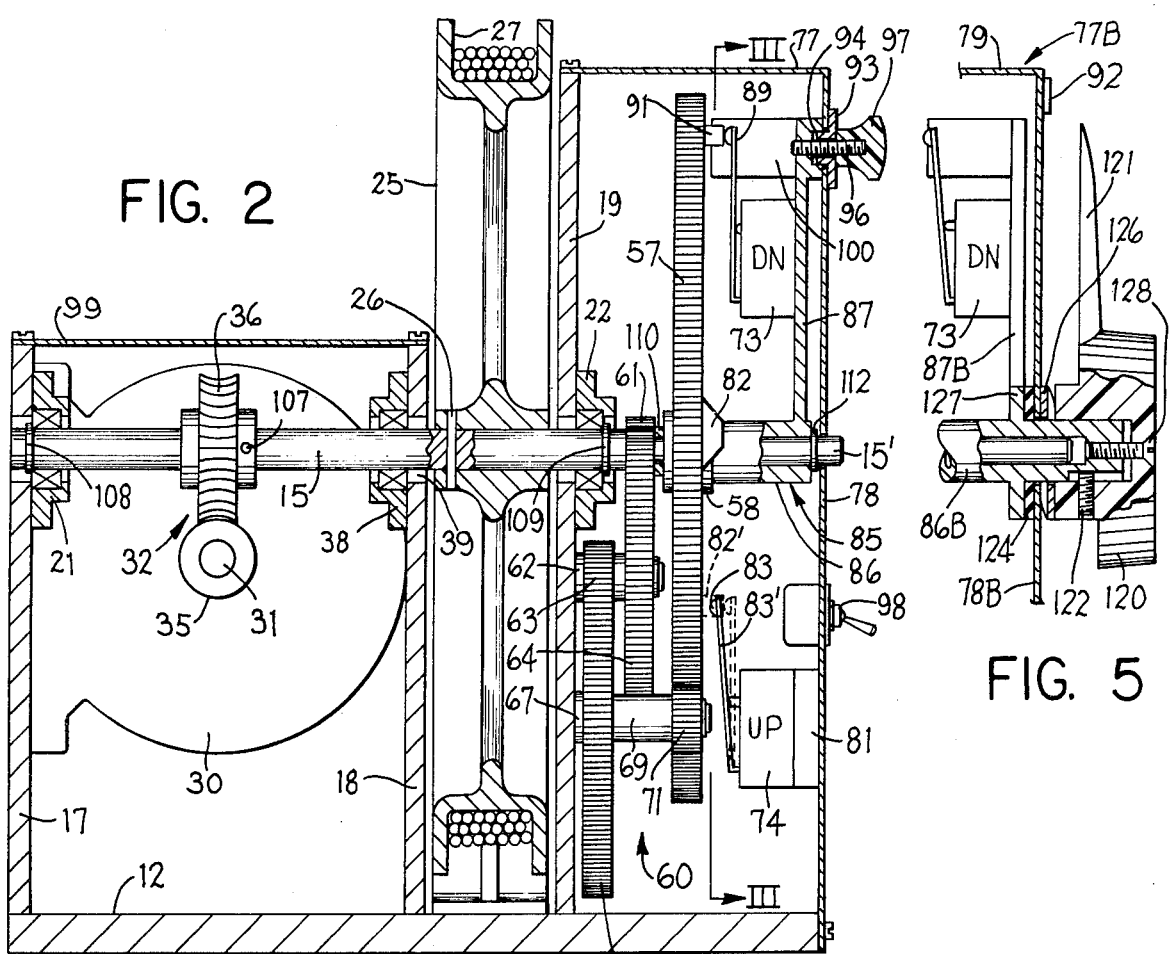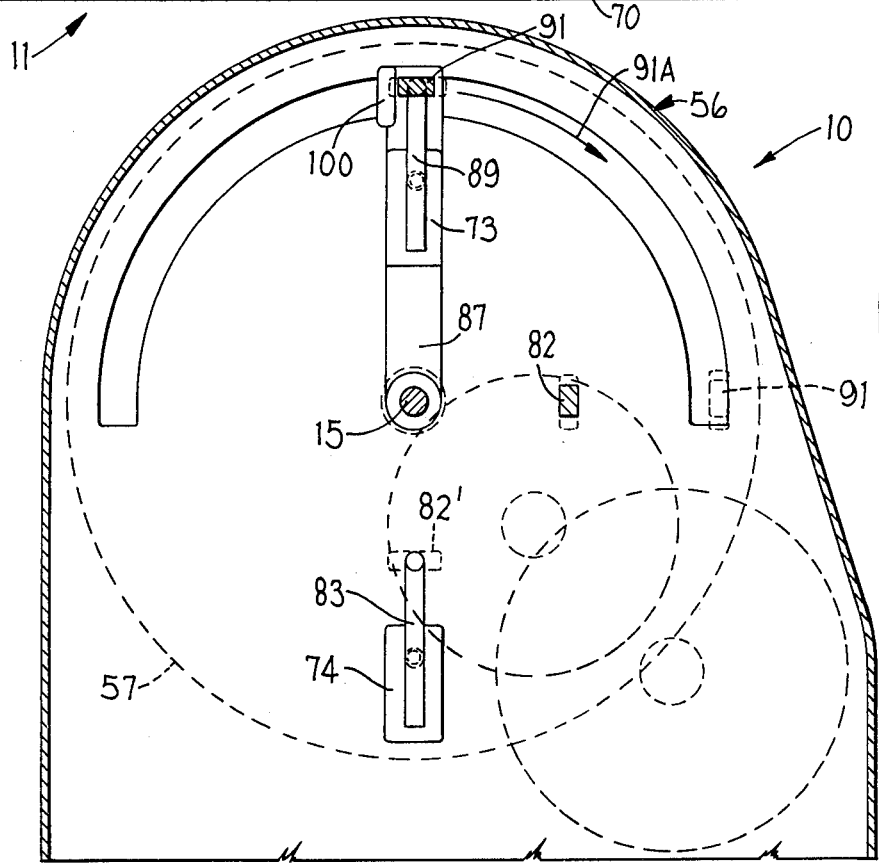

ELECTRIC OPERATED AUTOMATIC DOWNRIGGER

FIELD OF THE INVENTION

This invention relates to an electrically operated trolling downrigger and more particularly to such a downrigger adjustable to automatically stop when a preselected length of line has been pair out.

BACKGROUND OF THE INVENTION

In deep trolling for various kinds of fish it has long been known to support the required sinker, not on the fishing line itself, but rather on a separate downrigger line wound on a separately controlled downrigger reel. Conventionally, the fishing line is releasably secured to the sinker during trolling but springs free therefrom when struck by a fish. This permits the fish to be played and boated without encumbrance by the weight of the sinker, yet retains the sinker on the downrigger line for further use.

Entirely manually operated downriggers have long been widely commercially available and typically comprise a boat-supported frame rotatably mounting a hand-cranked line-carrying reel. The reel may be sized so that one rotation thereof corresponds to winding of a convenient length of line, for example two feet. The fisherman typically keeps track of the amount of line unwound from the reel by himself counting reel revolutions or by watching the dial of a conventional small mechanical counter tripped once or twice per revolution by the adjacent reel.

It has also been known to connect an electric motor to the reel for winding and unwinding the downrigger line, as disclosed for example in U.S. Pat. Nos. 3,719,331; 3,910,524 and 3,916,555. However, such prior devices fail to provide for automatic stopping of motor driven unwinding, requiring the fisherman to direct his attention continuously to the unwinding operation, as by counting reel rotations or watching a mechanical counter for the desired number of reel rotations and then manually switching off the motor. This wastes fisherman's time that might better be spent on other matters such as handling of other fishing gear or boat handling.

Several, for example four, downriggers are frequently used on a single boat to weight a similar number of fishing lines. When a fish is hooked on one fishing line, there may be a considerable risk of tangling of lines unless the remianing fishing lines and all downrigger lines are reeled in. Particularly in this situation, automatic shut off for reeling in is desirable to rapidly and without much attention from the fisherman avoid line tangling. On the other hand, considerable fisherman time is wasted if all of the several downrigger lines must be manually stopped in being relowered to the fishing depth. The time loss if either winding up or unwinding of downrigger lines is not automatic and it is particularly disadvantageous where, as is often the case, fish are striking in rapid succession but only over a relatively short time span such that any delay in raising and lowering downrigger lines may mean lost fish.

Prior U.S. Pat. No. 3,922,808 does provide automatic lowering, but not of a preselected length of line. Rather, lowering in this patent is to a preselected level above the lake or sea bottom or to a desired water temperature level. Unfortunately either of these capabilities requires complex and costly electronic circuitry for sensing bottom depth or water temperture, for determining the location of the downrigger weight with respect thereto, and for electronically controlling motor actuation. The result may thus as a practical matter be an initial cost beyond the budget of many fishermen, susceptibility to erratic operation due to static or engine ignition or atmospheric interference, relative fragility and susceptibility to damage from wind driven spray and waves, a need for sophisticated electronic knowledge and instrumentation for repair, and downrigger positioning capability outside the need of many fishermen. Also, the prior device is intended to continuously and automatically raise and lower the downrigger weight as the depth of the bottom or water temperature vary as the boat trolls from place to place, thereby accelerating reel drive wear and battery drain.

In addition, the apparatus of such prior U.S. Pat. No. 3,922,808, in its depth mode, depends on the echo of a sonic signal from the lake bottom and could be activated while passing over schools of fish, sunken vessels, or other submerged objects, leading to erroneous reel activation. Also in its depth mode, the patented apparatus is not a "stand alone" unit, since an expensive digital depth sounder must be used with it, the patented apparatus not being an automatic depth downrigger as such, but only an accessory which makes a digital depth sounder or control for a downrigger which does not have a calibrated depth control. Also, fishermen are now to a large extent using recording-type depth sounders which visually indicate on graph paper the depth at which fish are located, enabling the fisherman to drop has downrigger, with attached fishline, to that depth. However, such recording-type depth sounder, insofar as I am aware, does not have the necessary BCD output required by the patented downrigger device. This would necessitate having two depth sounders on the same boat, namely a recording type and a digital type. Aside from the obvious added cost, their close proximity raises a strong possibility of the two sounders interfering with each other.

Further, the aforementioned patents either fail to provide automatic stopping of both winding and unwinding reel rotation, or do so by separate and unrelated portions of the apparatus, thereby further increasing apparatus complexity and cost.

Accordingly, the objects of this invention include provision of a downrigger apparatus for fishing, which is capable of electric motor driven unwinding and winding of downrigger line and automatic stopping when a preselectable length of line has been unwound from the reel and also when a previously unwound length of line has been substantially fully rewound, so as to free the fisherman for other activity during such unwinding and winding operations.

A further object is to provide an apparatus, as aforesaid, adjustable to preselect the length of downrigger line to be unwound, manually actuable to initiate such unwinding of line from the reel which will automatically stop unwinding at the preselected length, and which will hold at that length until further manual intervention occurs.

A further object is to provide an apparatus, as aforesaid, which is free of complicated and expensive electronic circuitry, which is relatively inexpensive and simple to produce, which is primarily mechanical in nature and capable of maintenance and repair by persons with little training.

Further objects and purposes of this invention will be apparent to persons acquainted with apparatus of this general type upon reading the following specification and inspecting and accompanying drawings.

SUMMARY OF THE INVENTION

The objects and purposes of the invention are met by providing a downrigger apparatus for trolling in which an electric motor is energizable for winding and unwinding downrigger line from a real. A rotor is driven in reduced speed synchronism with the reel and automatically actuates up and down limit switches to stop winding and unwinding rotation of the reel by the motor. The down limit switch is carried by a support adjustable along the path of movement of the rotor through a range of positions corresponding to different lengths of line unwound from the reel, with cooperating pointer and indicia means to indicate the length of the line unwound from the reel.

BRIEF DESCRIPTION OF THE DRAWINGS

FIG. 1 is a partially broken pictorial view of a downrigger apparatus embodying the invention.

FIG. 2 is a central cross sectional view as taken on the line II—II of FIG. 1.

FIG. 3 is a sectional view substantially taken on the line III—III of FIG. 2.

FIG. 4 is a schematic diagram of circuitry associated with the FIG. 1 apparatus.

FIG. 5 discloses a modification.

DETAILED DESCRIPTION

A downrigger apparatus, embodying the invention, comprises a frame 11 (FIG. 2) including a base plate 12 fixedly securable to a trolling boat near the stern thereof.

A shaft 15 is spaced above the base plate 12 and extends transversely and loosely through openings, as at 39 in upstanding walls 17, 18 and 19 (FIG. 2) of frame 11. Bearings 21 and 22 near opposite ends of the shaft are fixed to frame 11, here to upstanding walls 17 and 19 thereof, and support shaft 15 for rotation relative to the frame.

A reel 25 is fixed on the shaft 15 for rotation therewith, as by a diametral pin 26 and has a grooved circumference 27 on which is wound a quantity of downrigger line L. The inner end of line L is anchored to the reel by any conventional means not shown. The effective diameter of reel 25 is selected such that one rotation of the reel corresponds to winding or unwinding of a convenient unit length of line.

A reversible electric motor 30 connects through an external speed-reduction drive means 32 to shaft 15. Motor 32 may comprise a conventional high-speed motor (for example a 1750 rpm motor), connected either directly or through a conventional internal reduction gear set not shown, to external drive means 32 to in turn drive shaft 15 and reel 25 at a considerably slower speed, preferably in the range of 15 to 75 rpm. Drive means 32 blocks rotation of the shaft of the de-energized motor despite any torque applied to the reel 25 by tension on line L, and thus acts as a brake or lock on the reel. In the preferred embodiment shown, drive means 32 thus comprises a worm drive in which a worm gear 35 on motor shaft 31 drives a pinion gear 36 fixed on reel shaft 15. If desired to further radially support shaft 15, an additional bearing 38 may be fixed on the frame wall 18 between drive means 32 and rotor 25.

A line guide 41 (FIG. 1) includes an arm 42 fixed to base 12 below reel 25 and extending rearwardly and somewhat upwardly therefrom. Arm 42 carries a rotatable pulley 44 near its rear end. The rear end of arm 42 is stepped downward at 45 to form a substantially horizontal tread 46. Downrigger line L extends rearward from reel 25 over a pully 44 and down through clearance hole 47 in tread 46. The lower end of downrigger line L conventionally terminates in a swivel and hook unit 49 for releasable attachment of a downrigger weight, or sinker, 51. A clip 52 on weight 51 releasably holds a fishline F in a conventional manner. Preferably, hole 47 is small enough to block upward movement of swivel unit 49 and thereby positively limit winding rotation of reel 25. Arm 42 may be somewhat springy and thus cushion mechanical shock, for example as swivel unit 49 is wound up into contact with tread 46.

A motor control 56 includes a rotor 57 (FIG. 2) mounted on, and freely rotatable with respect to, shaft 15 by a bearing 58. A speed reduction drive 60 of positive type drives rotor 57 in synchronism with rotation of reel 25 but at a substantially lower speed. The speed reduction is sufficient that a partial rotation (here a half revolution) of rotor 57 corresponds to the number of revolutions of reel 25 required to unwind therefrom the desired maximum length of line, normally the entire length of line wound on reel 25. In downriggers for Great Lakes fishing typical maximum line lengths normally lie in the range of 100 to 400 feet, and though a matter of choice, will normally correspond to the maximum length marked on a scale 92 hereafter described, a 200 foot scale being shown in FIG. 1.

In the preferred embodiment shown, drive 60 comprises a multistage, reduction gear train including a small diameter drive gear 61 fixed to shaft 15 by any convenient means such as a set screw or key not shown. A first countershaft 62 extends fixedly from frame wall 19 parallel to shaft 15. A common hub, suitably retained for rotation on countershaft 62, has fixed thereto respective larger and smaller gears 63 and 64 with the latter driven by drive gear 61. A second countershaft 67 extends fixedly from frame wall 19 parallel to first countershaft 62 and in turn rotatably supports and has suitably axially retained thereon a further common hub 69 to which are fixed respective larger and smaller gears 70 and 71. Larger gear 70 is driven by aforementioned gear 63 and smaller gear 71 in turn rotatably drives rotor 57 through gear teeth on the circumference of the latter.

The control 56 further includes down and up limit switches 73 and 74 (FIG. 2) each opposed to rotor 57 for actuation by a cam carried thereby. Each limit switch 73 and 74 is actuated at a respective point in the rotation of rotor 57. Up limit switch 74 is fixed with respect to frame 11. In the preferred embodiment shown, the gear train 60, rotor 57 and limit switches 73 and 74 are enclosed in and protected by a housing 77. Housing 77 conveniently comprises a sheet metal shell having a substantially planar end wall 78 and a substantially inverted U-shape peripheral wall 79. Up limit switch 74 may, for convenience, be mounted on housing end wall 78, with a suitable spacer 81 securing same in place, as by screws not shown. Up limit switch 74 closely opposes rotor 57. A cam 82 is fixed on rotor 57 at a radius to rotate past the actuating arm 83 of up limit switch 74 and is circumferentially positioned on rotor 57 to trip limit switch 74 when downrigger line L has been substantially fully rewound on reel 25, i.e. as swivel 49 approaches tread 46. The positions of cam 82 and switch arm 83, with up limit switch 74 thus actuated, are indicated in broken lines at 82' and 83' in FIG. 2.

The down limit switch 73 is mounted for circumferential adjustment with respect to rotor 57, in the preferred embodiment shown at FIGS. 2 and 3, to permit the fisherman to conveniently adjust the length of line L to be removed from reel 25 (or more precisely the length of line between swivel 49 and tread 46) for rotor 57 to actuate switch 73. In the preferred embodiment shown, a support 85 includes a hub 86 freely rotatable on a reduced diameter end portion 15= of shaft 15. Support 85 further includes a radial arm 87 fixed at its inner end to hub 85 and extending substantially in parallelism between housing end wall 78 and rotor 57. Limit switch 73 is fixed, by any convenient means such as screws not shown, to radial arm 87, such that the actuating arm 89 of down limit switch 73 opposes the circumferential path of travel of a cam 91 fixed on rotor 57.

In the preferred embodiment shown, radial arm 87 is circumferentially adjustable in juxtaposition to indicia arranged along a semicircular scale 92 (FIG. 1) visible to the fisherman and carries a pointer 93 superimposed on the scale 92 to inform the fisherman of the amount in feet of line required to be reeled out in order to actuate down limit switch 73. Pointer 93 is here mounted at the radially outer end of arm 87 by means of a hub 94 which extends loosely through a semicircular slot 95 in end wall 78. To reliably hold the arm 87 in a desired circumferential position of adjustment, pointer 93 is sleeved over a threaded rod 96 fixed to the free end of radial arm 87 and extending rightwardly through slot 95. A knob 97 threaded on rod 96 is tightenable to clamp the slot edges of housing wall 78 between pointer 93 and a boss on the radially outer end of radial arm 87. Preferably, the hub 94 of pointer 93 is non-circular in perimeter and is received snugly in a correspondingly shaped recess in the free end of radial arm 87, such that the pointer 93 is held to point radially outward with respect to shaft 15.

A manually actuable switch 98, preferably of double pole, double throw (with center off position) type, has stable up, off and down positions selectable by the fisherman to initiate energization of motor 30 to reel in line L, de-energization of the motor, and energization of the motor to reel out line L. Manual switch 98 is conveniently mounted on housing end face 78 near the manually positionable pointer 93.

Apparatus 10 is preferably provided with an additional, substantially inverted U-shape sheet metal housing 99 (FIGS. 1 and 2) to enclose and protect motor 30 and worm drive 32. Such housing 99 may simply take the form of a sheet metal member extending along and secured (as by screws) to the peripheral edges of frame walls 17 and 18.

FIG. 4 schematically discloses the electrical interconnection between motor 30, manual switch 98 and up and down limit switches 74 and 73. More particularly, motor 30 is a DC reversible motor (conveniently rated at 12 volts for compatibility with the usual 12 volt electrical system on fishing boats) having a pair of windings 101 and 102 alternatively energizable for rotating reel 25 to respectively unwind and wind line L. Limit switches 73 and 74 are normally closed switches and open upon the above-mentioned actuation by corresponding cam 91 or 82.

OPERATION

The apparatus shown in FIG. 2 may be assembled, for example, by first mounting bearings 21, 38 and 22 on upstanding frame walls 17, 18 and 19 and thereafter inserting shaft 15 axially through such bearings and through the gear 36 and reel 27 positioned, as shown, between such bearings. Thereafter, gear 36 and reel 25 may be fixed to the shaft by any convenient means, here by diametral through pins 107 and 26. Conventional, substantially C-shaped snap rings 108 and 109 may then be conventionally snapped in place in corresponding grooves in shaft 15 located immediately outboard of bearings 21 and 22 to axially fix the shaft with respect to frame 11.

Thereafter the speed-reducing gear train 60 may be assembled. Particularly, gear 61, a washer 110, rotor 57 and support 87 are slid onto the reduced diameter portion 15= of shaft 15 and are held against the rightward facing shoulder of the latter as by a further snap ring 112 or the like. Whereas rotor 57 and support 85 are rotatable with respect to shaft 15, drive gear 61 is fixed to the shaft for rotation therewith by any convenient means, as above-discussed. The further gear units 63, 64 and 70, 71 may be axially held on their corresponding stub shafts 62 and 67 by further snap rings. The remaining components may thereafter be installed to render apparatus 10 complete and ready for use.

Prior to trolling, the apparatus 10 is mounted on a boat, near the stern thereof, with the downrigger line L fully wound on reel 25 and with a fishing line F clipped to the sinker 51 on the lower end of line L, as seen in the drawings. In this fully wound condition, rotor 25 and cams 82 and 91 are in their zero positions indicated in broken lines at 82' and 91' in FIG. 3, with cam 82 holding up limit switch open. At this time, the fisherman may adjust the position of pointer 93 and hence of support 87 and down limit switch 73 circumferentially along scale 92 to preselect the desired length of line L to be unwound from reel 25 for trolling. For illustration, FIGS. 1-3 show pointer 93 adjusted through 90° from the zero position, which may correspond for example to a 100 foot length of line unwound.

Thereafter, manual actuation of switch 98 to its down position shown in FIGS. 1 and 4 energizes down motor winding 101 through closed down limit switch 73. Manual switch 98 is stable in its off, down and up positions and thus will not spring back to its off position upon release. Accordingly, having shifted switch 98 to its down position, the fisherman can then leave switch 98 alone and otherwise occupy himself, as with boat handling or with fishing gear or other downriggers, as the disclosed apparatus 10 automatically lowers weighted line L.

As the down winding 101 of motor 30 continues energized reel 25 rotates in the line unwinding direction to lower weighted line L and attached fishing line F. This moves rotor 57 angularly, at a speed much reduced from that of reel 25, away from its zero position and rotor 57 thus carries up cam 82 away from up limit switch 74, allowing the latter to close. This closure however has no immediate effect because manual switch 98 is in its down position, breaking the path through up limit switch 74 and up motor winding 102. Thus, motor 30 continues to drive reel 25 in the unwinding, or down, direction.

However, when the preselected amount of line L has been unwound, rotor cam 19 will have been angularly shifted by rotor 57 into opposition to down limit switch 73 to actuate and thus open such switch. This blocks current flow from the electrical source (indicated at 12V in FIG. 4) through down motor winding 101, the down positioned movable contact of switch 98 and the now open down limit switch 73. Accordingly, the motor 30 is automatically de-energized and rotation of reel 25 and rotor 57 stop. The resulting amount of line L depending from tread 46 in this condition thus corresponds to the amount originally set by the fisherman in positioning pointer 93 with respect to scale 92. If desired, the fisherman can manually stop unwinding operation at any point prior to down cam 91 reaching down limit switch 73, simply by manually shifting switch 98 to its middle, or off position, thereby breaking the electric current path through motor 30.

To reel in line L, for example when a fish has struck and removed fishline F from downrigger clip 52, the fisherman need merely flip the manual switch 98 to its up position. This energizes up motor winding 102 through closed up limit switch 74. Thereupon motor 30 rotates to reel in line and automatically return weight 51 to a position immediately below tread 46. The fisherman need give no further attention to the downrigger apparatus and is free to devote all his attention to the fish on line F since reel 25 stops automatically as gear train 60 returns rotor 57 to its zero, or fully wound, position at which up cam 82 opens limit switch 74 to automatically shut off motor 30.

The pointer 93 can be adjusted at any time by loosening clamp knob 97 and pivoting arm 87 to increase or reduce the footage setting on the scale 92. This will normally be done prior to lowering of downrigger line L as above described. However, a given fisherman may decide to radically decrease the footage setting during lowering of line L, and conceivably could move the down limit switch back (rightwardly in FIG. 3) past the then non-zero position of cam 91. This would momentarily open down limit switch 73 and shut off the motor. However, if cam 91 is circumferentially short and the fisherman continues rightward (FIG. 3) movement of pointer 93 therebeyond, the down limit switch actuator arm 89 would be released by cam 91, permitting down limit switch 73 to again close and cause resumption of unreeling. The problem here is that continued unreeling motion of reel 25 would move cam 91 away from, rather than toward down limit switch 73, which then could not automatically stop unreeling.

To avoid this problem, cam 91 may be extended circumferentially in the direction of arrow 91A or an angular distance substantially equal to the angular length of scale 92, here 180°. In this way, once cam 91 engages and hence opens down limit switch 73, retracting pointer 93 to a lower footage value simply moves the down limit switch actuator arm 89 along the extension of cam 91 and keeps the down limit switch open, so that cam 91 does not interfere with it or its actuator arm 83.

Where a circumferentially short cam 91 is desired, a rigid finger 100 fixed to the end of arm 87 extends leftward (FIG. 2) into the path of cam 91 to block inadvertant adjusting of pointer 93 and up limit switch 73 back (clockwise in FIG. 3) past cam 91.

MODIFICATION

FIG. 5 discloses a modification of the apparatus of FIG. 2, by which slot 95 in housing end wall 78 is eliminated, to reduce the chance for rain and spray to enter control housing 77 when trolling under adverse conditions. The FIG. 2 apparatus is modified by rightward extension of hub 86B through a clearance opening in housing end wall 78B. A hand wheel 120 is fixedly mounted on the end of hub 86B outside housing 77B for rotation therewith and with down limit switch 73 carried by the radial arm 87B extending from the interior portion of the hub. Hand wheel 120 includes a radially extending pointer 121 which terminates adjacent the band of scale indicia 92 to indicate the circumferential position of down limit switch 73 and hence the length of line selected to be unreeled. A set screw 122 prevents unwanted circumferential shifting of hand wheel 120 on hub 86B. Once adjusted to the desired circumferential location on scale 92, pointer 121 and down limit switch 73 and supporting hub 86B are held against unintended circumferential shifting along the scale 92, as by frictional gripping of housing end wall 78B. To this end, a friction washer 124 (e.g. of rubber) and a compression spring (here a metal wave washer) 126 are sleeved over hub 86B on opposite sides of end wall 78 and compressibly held between an annular base portion 127 of switch arm 87B and hand wheel 120. A friction adjustment screw 128 is axially adjustable, prior to tightening set screw 122, to move hand knob axially on hub 86B and thus vary the pressure of spring 126 on friction washer 124.

It is contemplated that each of limit switches 73 and 74 can be interchanged in position with its respective cam 91 and 83 but such is not preferred in that, for example, movement of the limit switches with the rotor would impose additional strain and wear on the wiring leading thereto and hence may be less reliable. Also, if desired, cam 91 may be made circumferentially adjustable on its rotor 57 with down limit switch 73 being fixed nonadjustably to the interior face of frame end wall 78, but such arrangement is not preferred because of substantially reduced convenience in setting of the length of line to be automatically paid out.

Although preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Apparatus for use as a downrigger in trolling, comprising:
   a frame;
   reel means rotatable with respect to said frame for winding and unwinding a quantity of line;
   electric motor means energizable for rotating said reel;
   limit switch means having a limit switch and an actuating cam means which are relatively movable such that the actuating cam means is engageable with said limit switch for tripping same to shut off said motor means;
   first and second supports carrying said limit switch and actuating cam means, respectively, said first support being normally fixed with respect to said frame, said second support being connected for movement in proportional relation to said reel and relative to said first support;
   means actuable for adjusting the position of said limit switch with respect to said frame and thereby changing the position of said second support along its path of travel at which said limit switch and actuating cam means come into said tripping relation to shut off said motor;

whereby to automatically stop unwinding of line from said reel means when a preset length has been unwound.

2. The apparatus of claim 1, in which said adjusting means comprises means mounting said first support for adjustment along the path of travel of said cam means so as to permit said cam means to trip said limit switch when a preselected amount of line has been unreeled from said reel means.

3. The apparatus of claim 2, in which said second support is a rotatable member and including means providing a positive driving connection between said reel means and rotatable second support member, said cam means being eccentrically fixed on said rotatable second support member, said first support being pivoted coaxially with said rotatable first support member to locate said limit switch at any desired point along the path of travel of said cam means.

4. The apparatus of claim 3, including a second limit switch fixed with respect to said frame at a point along the path of travel of said cam means, which point corresponds to a substantially full retraction of said line onto said reel means, said second limit switch being connected in circuit with said electric motor means for shutting same off during line retracting rotation thereof.

5. The apparatus of claim 3, further comprising means including a shaft rotatably supported on said frame for effecting one-way driving from said motor means to said reel means, said motor being energizable in forward and reverse directions for powered unwinding and winding of said line with respect to said reel, said one-way driving means preventing unwinding of line from said reel with said motor de-energized, said second support being carried on said shaft for rotation with respect thereto, said positive drive connection means comprising a speed reduction drive connecting said reel to said second support.

6. Apparatus for use as a downrigger in trolling, comprising:
a frame and an electric motor fixedly supported on said frame;
a shaft supported for rotation on said frame and rotatably driven by said motor;
a reel fixed to said shaft for rotation therewith;
a rotor rotatable with respect to said shaft and positive synchronizing, speed-reducing drive means rotatably driving said rotor with respect to said reel and having a speed-reducing ratio such that a partial revolution of said rotor corresponds to a substantially complete unwinding of line from said reel;
down and up limit switch means normally fixed with respect to said frame in opposed relation to said rotor and means on said rotor responsive to rotor rotation for tripping said down and up limit switch means at points corresponding to at least partially unwound and substantially fully wound line-on-reel conditions, said limit switch means being electrically connected with said motor and responsive to said tripping for shutting same off;
circumferentially adjustable support means for adjustably supporting said down limit switch means with respect to said frame, said support means opposing said rotor and being adjustable along the rotational path of said tripping means on said rotor for presetting the length of line required to be unwound from said reel in order to trip said down limit switch means.

7. The apparatus of claim 6, in which said frame includes wall means disposed along the path of adjustment of said support means, said wall means and support means carrying opposing, relatively adjustably movable pointer means and line length indicia to indicate the position of adjustment of said support means in terms of length of line to be unwound from said reel for tripping said down limit switch, and means for holding said support means in a desired position of adjustment with respect to said frame.

8. The apparatus of claim 6, in which said speed-reducing drive means comprises a multiple step reduction gear assembly, said rotor and adjustable support means being coaxially supported on said shaft and being freely rotatable with respect to said shaft and to each other.

9. The apparatus of claim 8, in which said motor drives said shaft through a worm gear, said worm gear preventing rotation of the unenergized motor by a torque applied to said reel.

10. Apparatus for use as a downrigger in trolling, comprising:
a frame;
reel means rotatable with respect to said frame for winding and unwinding a quantity of line;
electric motor means energizable for rotating said reel, wherein said electric motor means has first and second winding means alternatively electrically energizable for causing forward and reverse motor rotation respectively;
limit switch means having first and second parts relatively movable into tripping relation for shutting off said motor means;
first and second supports carrying said first and second limit switch parts, respectively, said first support being normally fixed with respect to said frame, said second support being connected for movement in proportional relation to said reel and relative to said first support;
means actuable for adjusting the position of one of said limit switch means parts with respect to said frame and thereby changing the position of said second support along its path of travel at which said first and second limit switch means parts come into said tripping relation to shut off said motor, whereby to automatically stop unwinding of line from said reel means when a preset length has been unwound;
a manually actuable up-down selector switch mounted with respect to said frame and actuable to alternately connect said first and second motor winding means in series with first and second limit switches respectively, said first limit switch being a part of said limit switch means and openable to stop line unwinding rotation of said motor means, said second limit switch being a further limit switch positioned on said frame for opening by said second support when said line approaches being fully wound on said reel.

* * * * *